Oct. 25, 1938.   C. H. ZIMMERMAN   2,134,069
CUTTING TOOL
Filed May 29, 1936   2 Sheets-Sheet 1

INVENTOR.
CHARLES H. ZIMMERMAN,
BY Ramsey and Ravr
ATTORNEYS.

Oct. 25, 1938.                    C. H. ZIMMERMAN                    2,134,069
                                    CUTTING TOOL
                               Filed May 29, 1936                 2 Sheets-Sheet 2
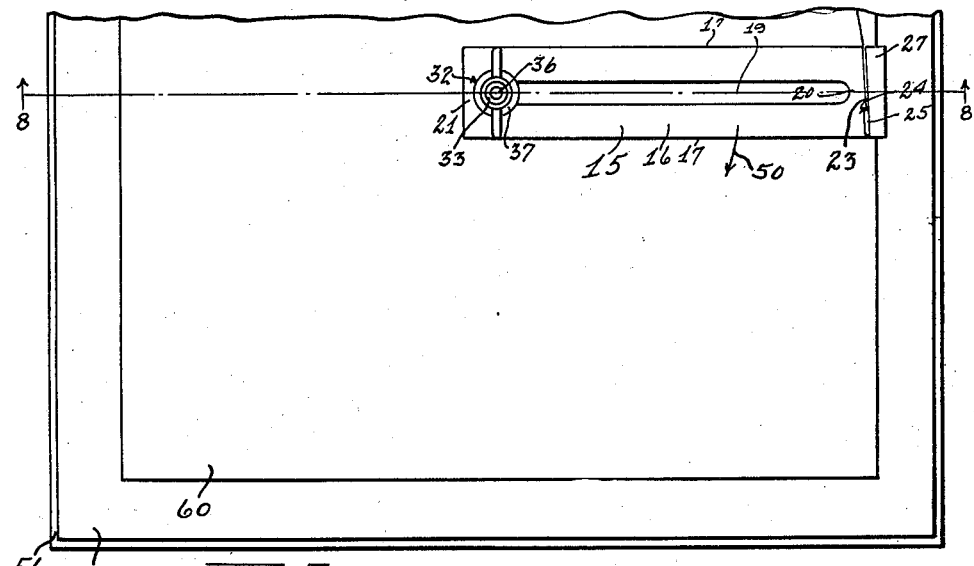
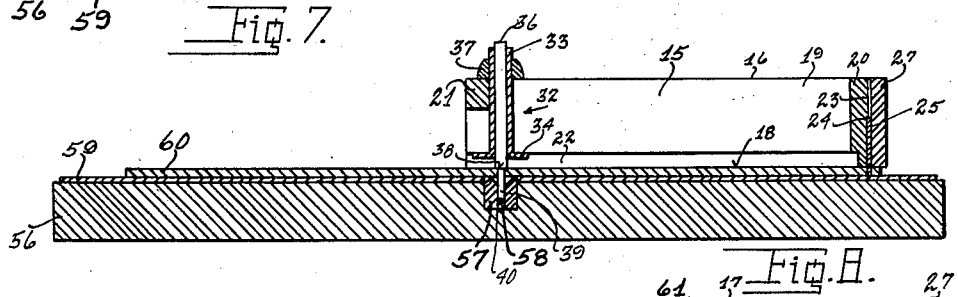
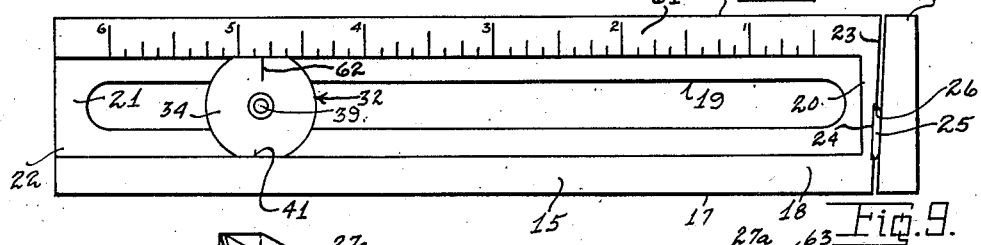
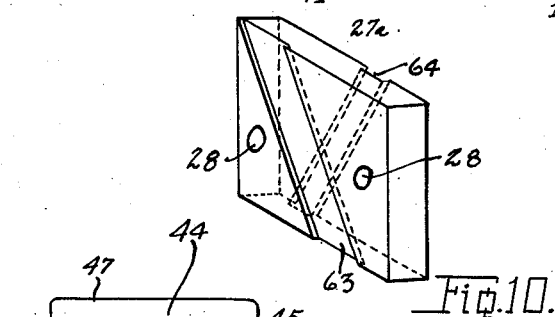
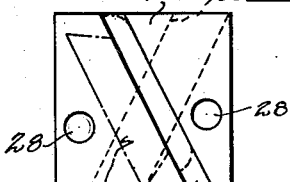
INVENTOR.
CHARLES H. ZIMMERMAN,
BY
Ramsey and Rave
ATTORNEYS.

Patented Oct. 25, 1938

2,134,069

UNITED STATES PATENT OFFICE 2,134,069

CUTTING TOOL

Charles H. Zimmerman, Norwood, Ohio

Application May 29, 1936, Serial No. 82,561

20 Claims. (Cl. 164—71)

This invention relates to a hand tool or cutting tool particularly adapted for the cutting out of rings, disks, and the like from flat sheet stock such as gasket material.

The principal object of the present invention is the provision of a hand cutting tool which will efficiently and expeditiously cut out rings and disks from flat stock such as paper, rubber, compressed gasket material, rubber compositions, and the like.

Another object of this invention is the provision of a tool for the purpose above specified in which the cutter may be readily adjusted and still maintain its proper position relative to the tool as a whole whereby the most efficient results are obtained.

A further object of the invention is the provision of a tool as above referred to which utilizes a relatively thin cutting blade and with the said blade so positioned relative to the tool as to prevent breakage of the blade during the use of the tool.

A further object of this invention is the provision of a cutting tool for the purpose above specified which can be readily adjusted to cut various sizes of disks and rings from the smallest size of gaskets to the largest sizes usually employed.

It is also an object of this invention to provide an improved cutter or blade for use with tools of this kind, and which cutter or blade may be readily sharpened to increase its life without in anywise decreasing its efficiency.

Other objects and advantages of the present invention should be readily apparent by reference to the following specification considered in conjunction with the accompanying drawings forming a part thereof, and it is to be understood that any modifications may be made in the exact structural details there shown and described, within the scope of the appended claims, without departing from or exceeding the spirit of the invention.

In the drawings:

Fig. 7 is a fragmentary top plan view of the tool of this invention mounted on a cutting board and in the act of producing a disk;

Fig. 8 is a transverse sectional view of Fig. 7 as seen from line 8—8 on said Fig. 7;

Fig. 9 is a bottom plan view of the tool;

Fig. 10 is a perspective view of the clamping cap showing a slight modification in the cap whereby different kinds or styles of cutters may be accommodated;

Fig. 11 is an elevational view of the cap of Fig. 10 showing in plan the grooves for accommodation of the different cutters and showing one of the improved cutters of this invention in position thereon; and Fig. 12 is an elevational view of one of the improved cutters of this invention.

Throughout the several views of the drawings similar reference characters are employed to denote the same or similar parts.

Figure 1:
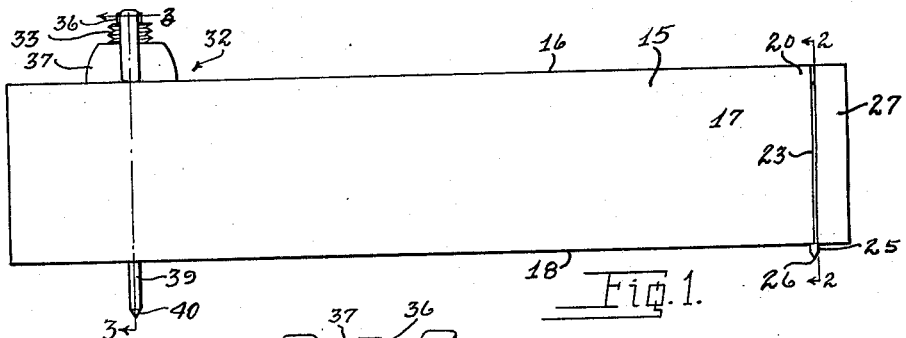
Fig. 1 is a side elevational view of the improved cutting tool of this invention.

In the past gaskets of a comparatively special size or dimension have been made by mechanics while on the job and for this purpose shears, knives, chisels, and the like have been employed. Use has also been made of a so-called gasket cutter attachment used in connection with the hand brace for producing gaskets. In each of these instances either a very inferior gasket has resulted or an unusual amount of time has been consumed in the production of the gasket and in each case either the tools or the resultant gasket were unsatisfactory. By the gasket cutter of the present invention gaskets of practically any size and of any material can be readily and expeditiously produced due to the efficient cooperation of the parts with one another and the rapidity with which the tool can be set up or adjusted.

Specifically, the tool of this invention comprises a body member 15 having a top 16, sides 17 and a bottom 18. Extending substantially throughout the length of the body portion 15 is a groove 19 which extends from the top 16 to the bottom 18. The groove 19 is closed at the forward end by the front 20 and at the rear and near the top thereof by the web or fin 21. In addition the body 15 is provided in its bottom 18 with a widened slot 22 extending from the front 20 rearwardly to the rear edge thereof.

As seen in Fig. 7 the front 20 has its front face 23 cut on an angle to the sides 17, that is the front face 23 extends rearwardly and to the left as seen in Figs. 1, 5, 6, and 7. This angle is relatively small and approximates an angle as established by the arc through which the forward end of the body of the tool passes during the cutting of circular disks, gaskets, and the like. As will be later pointed out, this angular face materially holds down the breakage of the relatively thin and flexible cutting blades used with this tool.

Figure 2:
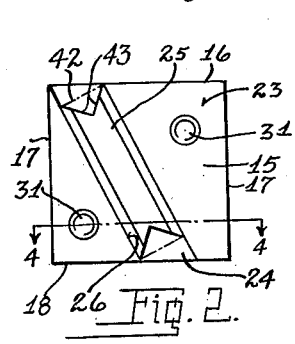
Fig. 2 is a front elevational view of the tool with the blade securing cap removed as seen more particularly from line 2—2 on Fig. 1.
Figure 4:
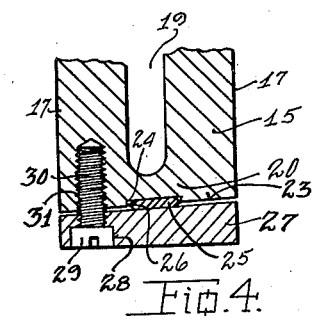
Fig. 4 is a fragmentary horizontal sectional view through the front end of the cutting tool as seen more particularly from line 4—4 on Fig. 2.

As seen in Fig. 2, the front face 23 of the body is provided therein with a groove 24 extending diagonally of the face. This groove 24 is adapted to accommodate a cutting blade or tool 25. As seen in Figs. 2 and 4 the slot 24 is just wide enough to accommodate the double-edged blade 25 and as will be observed in Fig. 4 is only partially as deep as the blade is thin. The degree of inclination of the slot 24 is arranged to bring the cutting edge 26 of the blade at the longitudinal center of the body 15 as said blade is projected below the bottom 18. It is believed that this will be readily evident from Fig. 2 since the cutting edge 26 will be projected below the tool body 15 along a line incident to the direction of inclination of the slot 24, and this slot crosses the bottom 18 at the center of the said body portion.

In order to secure the cutting blade 25 in position use is made of a cap plate 27 being provided with two or more counter-bored apertures 28 for receiving the heads 29 of screws or bolts 30. The counter-bored apertures 28 are axially aligned with threaded bores 31 formed in the forward end of the tool body 15. The inner face of the caps 27 is illustrated in Figs. 1 and 4 as plane and since the cutting blades 25 are thicker than the groove 24 is deep the said blades will project beyond the body face 23 and will therefore be engaged by the plane inner surface of the cap 27, and upon the tightening of the screws 30 the blade 25 will be securely clamped in position regardless of their axial adjustment relative to the groove 24.

Figure 3:
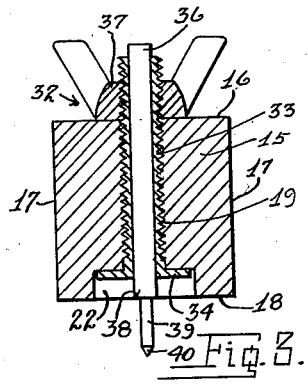
Fig. 3 is a transverse sectional view through the tool and centering mechanism as seen from line 3—3 on Fig. 1.

Projecting into and through the body slot 19 is one or more center assemblies indicated in general in the drawings by the reference numeral 32. These centering assemblies each comprises a post 33 having its sleeved portion threaded and having an enlarged head 34 at the lower end of the sleeve. The sleeves 33 may be bored throughout their length as illustrated in Fig. 3, or may be only partially bored as illustrated at 35 in Fig. 5. In either case the posts 33 are adapted to receive the cylindrical portion 36 of a centering pin, while the threaded exterior of the sleeve receives a suitable clamping or lock nut such as the thumb nut 37. The centering pins 36 are provided near their lower ends with a shoulder 38 from which projects the pin 39 having a pointed end 40. As seen in Fig. 9 the post heads 34 have flattened portions 41 thereon at diametrically opposed points and the distance between these flats is substantially equal to the width of the bottom slot 22 and acts to hold the post 33 against rotation while the nuts 37 are being actuated to secure and release the centering mechanisms in position.

In use the centering mechanism 32 is adjusted longitudinally through the slot 19 toward and from the cutter blade 25 so that the distance between the point 40 of the centering pin and the cutter edge 26 is equal to the radius of the disk or gasket to be cut. The centering pin 36 is then driven through the material to be cut with the portion 39 disposed in a table-top or other supporting structure with the shoulder of the pin resting on the upper surface of the material. The post 33 is then placed over the pin 36 and the blade 25 forced into the material to be cut. The blade 25 has, of course, been projected below the bottom of the cutter body an amount substantially equal to the thickness of the material to be cut. With the parts in this position the tool is actuated around the axis of the centering pin 36 with a resultant disk or gasket having a diameter equal to twice the distance between the centering pin point 40 and blade cutting edge 26.

From the foregoing it will be noted that the tool body 15 has considerable width and that the cutting point or edge 26 projects from the said body at a point substantially midway of the width thereof. By this construction considerable of the body bottom projects ahead of the cutting edge and with the entire bottom of the body on the surface of the material being cut. The movement of the cutter body around the axis of the centering pin has the tendency of ironing out said material and placing same under sufficient tension to hold it during the cutting thereof by the blade 26. By this construction circular disks and gaskets are produced of accurate dimensions and having the edges true and sharp.

It should be noted at this time that it is contemplated to use a height and width of body to completely house at least the cutting edge 26 of the blade 25 as shown for example in Figs. 2 and 11. In Fig. 2 there is illustrated a cutting blade having both longitudinal edges keen or sharp thereby providing four corners either one of which may be used as the cutting portion. A regular rectangle blade may be employed if desired with the ends normal to the keen edges as illustrated in phantom lines at 42. Preferably, however, it is desired to form a V-groove such as 43 in each end of the blade, thereby reducing the metal immediately behind the point where the cutting takes place and at the same time producing a blade which can be readily sharpened, should the points of the keen edges break off, by merely increasing the depth of the V-groove. In Fig. 12 is illustrated a cutting blade 44 which is of the general construction of razor blades now on the market and comprises a relatively thin blade portion 45 having one keen edge 46 and reenforced at its other end by the folded over reenforcing member 47. In this type of cutter 44 the ends of the blade 45 are again beveled or cut back as at 48 and 49 to reduce the material immediately behind the cutting edge 46 and at the same time afford a means of sharpening the blade should the corner thereof be broken.

As was noted above the front face of the body portion is disposed at a receding angle to the forward side thereof, that is the said face recedes from the direction into which the tool is moved; that is clockwise, as indicated by the arrow 50 in Fig. 7. In this way the blade tends to follow the circle through which it is passing without having to be flexed through the arc which it would naturally take. This angular disposition of the blade prevents the splitting or cracking of the same which would be the case if the face of the cutter were normal to the sides and the blade forced to assume the arc of the cut it is making. To further increase the life of the blade the material immediately behind the cutting edge is removed as shown at 43 in Fig. 2 and at 48 and 49 in Fig. 12.

Figure 5:
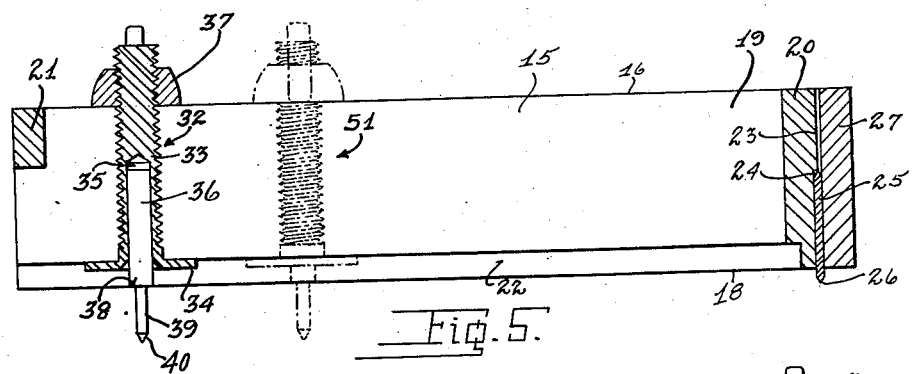
Fig. 5 is a longitudinal sectional view through the cutting tool.

As is usual gaskets have an outside diameter equal to the outside diameter of the pipe or flange with which they are used and an inside diameter equal to the bore of the pipe. In the making of such as gasket it is, of course, necessary to make two cuts, one for the outside and one for the inside. By utilizing two centering mechanisms 32 with the body 15 they may be set up before either cut is made and the outside cut made first, whereupon the tool is lifted from the centering pin and the second centering mechanism placed thereon for effecting the second cut. Such a setup is illustrated in Fig. 5 with the one centering mechanism 32 illustrated in full lines and the second centering mechanism illustrated in dotted lines at 51.

Figure 6:
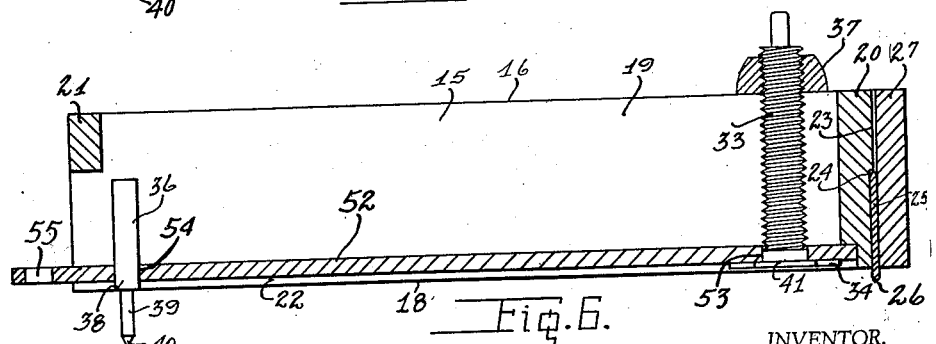
Fig. 6 is a longitudinal sectional view similar to Fig. 5 showing an extension bar in position thereon whereby the capacity of the tool may be increased.

As is natural the body portion 15 will have a length to produce disks and gaskets within a range of the most common sizes; for example, up to 12 inches in outside diameter. It is, however, sometimes desirable or necessary to make gaskets beyond this size, and in order to produce such gaskets use is made of an extension bar 52, see Fig. 6. The extension bar 52 is of flat material of a width equal to the width of the bottom slot 22 and of a depth whereby it along with the post head 34 will be accommodated. As seen in Fig. 6, the extension bar 52 is provided at its forward end with an aperture 53 through which the centering mechanism post 33 passes, and the extension bar is provided at its other end with apertures 54 and 55. The aperture 54 is positioned in the extension bar 52 at a point which is the maximum of the tool without the bar and this aperture is disposed on the centering pin when the extension bar is employed. The aperture 55 is made necessary in order to produce gaskets having a dimension substantially double that of the tool without the bar and to take care of the sizes between this double maximum and the space lost by the thickness of the body front 20 and post head 34.

In Figs. 7 and 8 there is illustrated a cutting board, adapted to be employed with the cutting tool, which comprises a base or support member 56 which may be conveniently formed of wood, such as ply wood, or some other relatively soft composition material which, should the cutting edge of the blade contact, will not materially dull. Disposed in the center of the cutting board 56 is a metallic bushing 57 having an aperture or hole 58 therethrough of a diameter equal to the centering pin 39. The bushing 57 has its upper end projecting above the upper surface of the board 56, and mounted on the board around the bushing 57 is a facing material 59 which may conveniently be replaceable cardboard or the like. In the use of this mechanism the material 60 from which the disk or gasket is to be cut is placed on top of the facing 59 and the centering pin 39 forced therethrough into the bushing hole 58, whereupon the tool is moved in a clockwise direction as indicated by the arrow 50 in Fig. 7 for effecting the disk or gasket cut. The parts are so arranged that the bushing 57 while projecting above the cutting board 56 does not project above the facing 59, wherefore the bottom 18 of the tool will lie flush with the upper surface of the material being cut and will effect an ironing of the material during the cutting as fully described above.

In order to facilitate the setting up of the tool the bottom 18 thereof, along one side of the slot 22 therein, may be provided with scale indications 61 which are calibrated from the cutting or keen edge 26 of the blade 25, the said graduations 61 cooperating with a mark or pointer 62 formed on the bottom of one of the post heads 34.

In Figs. 10 and 11 is illustrated a slight modification of the invention in that instead of the cutter groove 24 being formed in the face 23 of the body the said groove may be formed in the head 27. As shown in these figures the head 27 is provided in its one face with a groove 63 which is similar to the groove 24 and is provided in its other face with a second groove 64. The groove 64 is adapted to receive the reenforced end 47 of the blade 45 while the groove 63 receives the entire blade 25 the same as the groove 24. It will, of course, be understood that these grooves 63 and 64 are of a depth less than the thickness of the blade and the reenforcing end 47, while the face 23 of the body portion in this instance is plane, so that the clamping of the blade takes place as above described.

It is believed now evident, from the foregoing description, that there has been provided a gasket cutter which will effectively and efficiently produce circular gaskets and disks.

What is claimed is:

1. In a cutting tool of the class described the combination of a body member having a relatively broad base portion which rests upon and moves over the material being cut, a cutting blade at one end of said body portion, and a centering pin carried by the body portion for adjustment toward and from the cutting blade about which the tool is actuated for producing circular disks and gaskets, the base of the body member being utilized as means for ironing out the material ahead of the cut, the said center adjusting means comprising a post extending through a slot in the body member, and clamp means on said post for securing the post in adjusted positions longitudinally of the body member.

2. In a cutting tool of the class described comprising a body member having a face at one end thereof, said face having a groove formed therein and extending diagonally thereof and with one side of the groove intercepting the longitudinal center of the body member, a cutting blade in said groove having its keen edge at the above-noted side of the groove, said blade being adjustable longitudinally of the groove to project the blade more or less beyond the base of the body member, and means secured to the face end of the body member for securing the blade in adjusted positions.

3. In a cutting tool of the class described comprising a body member having a face at one end thereof, said face having a groove formed therein and extending diagonally thereof and with one side of the groove intercepting the longitudinal center of the body member, a cutting blade in said groove having its keen edge at the above-noted side of the groove, said blade being adjustable longitudinally of the groove to project the blade more or less beyond the base of the body member, means secured to the face end of the body member for securing the blade in adjusted positions, and a center or pivoting mechanism carried by the body member and adjustable toward and from the cutting blade about which the body member is actuated during the cutting of disks and gaskets.

4. In a cutting tool of the class described comprising a body member having a face at one end thereof, said face having a groove formed therein and extending diagonally thereof and with one side of the groove intercepting the longitudinal center of the body member, a cutting blade in said groove having its keen edge at the above-noted side of the groove, said blade being adjustable longitudinally of the groove to project the blade more or less beyond the base of the body member, means secured to the face end of the body member for securing the blade in adjusted positions, and a center or pivoting mechanism carried by the body member and adjustable toward and from the cutting blade about which the body member is actuated during the cutting of disks and gaskets, comprising an apertured post projecting through a slot in the body member, means for securing the post in position, and a centering pin adapted to be driven through the material being cut and received in the post.

5. In a cutting tool of the class described the combination of a body member having a slot extending through the body member and closed at one end by a face portion and at the other end by a web portion, a centering mechanism in the slot for adjustment toward and from the face and web portions and about which the tool is actuated during the cutting of circular disks and gaskets, said face of the body member being angularly related to the longitudinal axis of the body member to such an extent as to be substantially coincident with the angular movement of said face during its circular motion about the centering mechanism, and a cutter blade secured to the angular face.

6. In a cutting tool of the class described the combination of a body member having a slot extending through the body member and closed at one end by a face portion and at the other end by a web portion, a centering mechanism in the slot for adjustment toward and from the face and web portions and about which the tool is actuated during the cutting of circular disks and gaskets, said face of the body member being angularly related to the longitudinal axis of the body member to such an extent as to be substantially coincident with the angular movement of said face during its circular motion about the centering mechanism, said face having a slot extending diagonally thereof, a cutter blade disposed in said slot for movement relative thereto, and means for securing the cutter blade in the slot.

7. In a cutting tool of the class described the combination of a body member having a slot extending through the body member and closed at one end by a face portion and at the other end by a web portion, a centering mechanism in the slot for adjustment toward and from the face and web portions and about which the tool is actuated during the cutting of circular disks and gaskets, said face of the body member being angularly related to the longitudinal axis of the body member to such an extent as to be substantially coincident with the angular movement of said face during its circular motion about the centering mechanism, said face having a slot extending diagonally thereof, a cutter blade disposed in said slot for movement relative thereto, and means for securing the cutter blade in the slot comprising a head removably secured to the body member face.

8. In a cutting tool of the class described the combination of a body member having a relatively broad base, a cutting blade at one end of the body member, a centering mechanism carried by the body member for adjustment toward and from the cutting blade, the body member having a slot in its base, and an extension bar in the base slot adapted for cooperation with the centering mechanism and whereby the said centering mechanism may be adjusted beyond the body member.

9. In a circular disk and gasket cutting mechanism the combination of a cutting board, a yieldable facing on said board, a metallic bearing at the center of the cutting board, and a manually operable cutting tool above the yieldable lining comprising a body member having a centering pin associated therewith for insertion in the metallic bearing, and a cutter blade carried by the body member.

10. In a circular disk and gasket cutting mechanism the combination of a cutting board, a yieldable facing on said board, a metallic bearing at the center of the cutting board, a manually operable cutting tool above the yieldable lining comprising a body member having a centering pin associated therewith for insertion in the metallic bearing, a cutter blade carried by the body member, and means for mounting the centering pin on the body member for adjustment longitudinally thereof.

11. In a circular disk and gasket cutting mechanism the combination of a cutting board, a yieldable facing on said board, a metallic bearing at the center of the cutting board, a manually operable cutting tool above the yieldable lining comprising a body member having a centering pin associated therewith for insertion in the metallic bearing, a cutter blade carried by the body member, means for mounting the centering pin on the body member for adjustment longitudinally thereof, and additional means for mounting the cutting blade on the body member for depth adjustment relative thereto.

12. In a circular disk and gasket cutting mechanism the combination of a cutting board, a centering bushing on said board and projecting thereabove, a relatively soft facing on said board around the bushing and said facing and bushing having their upper surfaces flush whereby the material to be cut will lie flat on the facing material, and a cutting tool mounted on the centering bushing for circular movement relative thereto and including a cutting blade for cutting the material.

13. In a circular disk and gasket cutting mechanism the combination of a cutting board, a centering bushing on said board and projecting thereabove, a relatively soft facing on said board around the bushing and said facing and bushing having their upper surfaces flush whereby the material to be cut will lie flat on the facing material, a centering pin projecting from the bushing through and above the material to be cut, a body member mounted on said pin for circular movement therearound, and a cutting blade at one end of the body member.

14. In a circular disk and gasket cutting mechanism the combination of a cutting board, a centering bushing on said board and projecting thereabove, a relatively soft facing on said board around the bushing and said facing and bushing having their upper surfaces flush whereby the material to be cut will lie flat on the facing material, a centering pin projecting from the bushing through and above the material to be cut, a body member mounted on said pin for circular movement therearound, a cutting blade at one end of the body member, and means for longitudinally adjusting the body member and supported cutting blade relative to the centering pin.

15. As an article of manufacture a cutting blade of relatively thin material having its longitudinal sides of substantially the same length and a keen edge extending along one of said sides the lateral sides of the blade being disposed at an acute angle to the keen edge whereby a point is provided at the ends of the keen edge which may be replaced upon breakage by deepening the angular end of the blade.

16. As an article of manufacture a cutting blade of relative thin material having its longitudinal sides of substantially the same length and a keen edge extending along one of said sides the lateral sides of the blade being disposed at an acute angle to the keen edge whereby a point is provided at the ends of the keen edge which may be replaced upon breakage by deepening the angular end of the blade, and a reenforcing member extending along the other side of the blade.

17. In a cutting tool of the class described, the combination of a body member having a relatively broad base portion which rests upon and moves over the material being cut, said body member having a face at one end thereof which is angularly related to the longitudinal axis of the body member to such an extent as to be substantially coincident with the angular movement of said face during a circular motion of the body member, a cutter blade associated with the angular face of the body member, and a centering pin mounted on the body member and about which the body member is actuated for circular movement during the cutting of discs and gaskets.

18. In a cutting tool of the class described, the combination of a body member having a relatively broad base portion which rests upon and moves over the material being cut, said body member having a face at one end thereof which is angularly related to the longitudinal axis of the body member to such an extent as to be substantially coincident with the angular movement of said face during a circular motion of the body member, a cutter blade associated with the angular face of the body member, a centering pin mounted on the body member and about which the body member is actuated for circular movement during the cutting of discs and gaskets, and means for securing the cutter blade to the angular face for depth adjustment.

19. In a cutting tool of the class described, the combination of a body member having a relatively broad base portion which rests upon and moves over the material being cut, said body member having a face at one end thereof which is angularly related to the longitudinal axis of the body member to such an extent as to be substantially coincident with the angular movement of said face during a circular motion of the body member, a cutter blade associated with the angular face of the body member, a centering pin mounted on the body member and about which the body member is actuated for circular movement during the cutting of discs and gaskets, and means for securing the centering pin to the body member for longitudinal adjustment relative thereto toward and from the cutter blade.

20. In a cutting tool of the class described, the combination of a body member having a relatively broad base portion which rests upon and moves over the material being cut, said body member having a face at one end thereof which is angularly related to the longitudinal axis of the body member to such an extent as to be substantially coincident with the angular movement of said face during a circular motion of the body member, a cutter blade associated with the angular face of the body member, a centering pin mounted on a body member and about which the body member is actuated for circular movement during the cutting of discs and gaskets, means for securing the cutter blade to the angular face for depth adjustment, and means for securing the centering pin to the body member for longitudinal adjustment relative thereto toward and from the cutter blade.

CHARLES H. ZIMMERMAN.